(12) United States Patent
Kim et al.

(10) Patent No.: US 12,216,777 B2
(45) Date of Patent: Feb. 4, 2025

(54) UNMANNED AERIAL VEHICLE AND APPARATUS FOR GENERATING SOURCE FILES PROVIDING CONFIDENTIAL INFORMATION PROTECTION OF UNMANNED AERIAL VEHICLE

(71) Applicant: ELECTRONICS AND TELECOMMUNICATIONS RESEARCH INSTITUTE, Daejeon (KR)

(72) Inventors: Deok-Jin Kim, Daejeon (KR); Sang-Wook Lee, Daejeon (KR)

(73) Assignee: ELECTRONICS TELECOMMUNICATIONS RESEARCH INSTITUTE, Daejeon (KR)

( * ) Notice: Subject to any disclaimer, the term of this patent is extended or adjusted under 35 U.S.C. 154(b) by 371 days.

(21) Appl. No.: 17/698,582

(22) Filed: Mar. 18, 2022

(65) Prior Publication Data
US 2023/0061849 A1    Mar. 2, 2023

(30) Foreign Application Priority Data
Aug. 18, 2021    (KR) .......................... 10-2021-0108812

(51) Int. Cl.
*H04L 29/06*    (2006.01)
*G06F 21/62*    (2013.01)

(52) U.S. Cl.
CPC ................ *G06F 21/6209* (2013.01)

(58) Field of Classification Search
None
See application file for complete search history.

(56) References Cited

U.S. PATENT DOCUMENTS

| | | | | |
|---|---|---|---|---|
| 9,310,221 | B1 * | 4/2016 | Downey | G01C 23/00 |
| 10,762,183 | B1 * | 9/2020 | Charan | G06F 21/40 |
| 11,442,926 | B2 | 9/2022 | Jo et al. | |

(Continued)

FOREIGN PATENT DOCUMENTS

| | | |
|---|---|---|
| KR | 10-0932924 B1 | 12/2009 |
| KR | 10-1790325 B1 | 10/2017 |

(Continued)

*Primary Examiner* — Shin-Hon (Eric) Chen
(74) *Attorney, Agent, or Firm* — LRK PATENT LAW FIRM

(57) ABSTRACT

Disclosed herein is an apparatus for creating source files for providing a function of protecting the confidential information of an unmanned aerial vehicle (UAV). The apparatus may include a creation module for creating a secure encoder source file and a secure decoder source file from a configuration file that contains confidential information to be protected, among data communicated or stored by the UAV. Here, the secure encoder source file and the secure decoder source file may be used to build the program of the UAV such that the UAV extracts confidential information from data and encrypts or decrypts the same when it communicates or stores the data.

Accordingly, using the program that is built using the secure encoder source file and the secure decoder source file, the UAV may extract only the confidential information and encrypt and decrypt the same when it communicates or stores the data.

3 Claims, 4 Drawing Sheets

(56) References Cited

U.S. PATENT DOCUMENTS

| | | | |
|---|---|---|---|
| 11,960,283 B1* | 4/2024 | Manouchehri | H04L 9/50 |
| 2017/0045884 A1* | 2/2017 | Kablaoui | H04L 65/61 |
| 2017/0234966 A1* | 8/2017 | Naguib | G01S 13/86 |
| | | | 367/117 |
| 2020/0310408 A1* | 10/2020 | Carper | G05D 1/101 |
| 2021/0092109 A1* | 3/2021 | Braverman | H04W 12/069 |
| 2021/0299875 A1* | 9/2021 | Iyer | G06Q 10/20 |

FOREIGN PATENT DOCUMENTS

| | | |
|---|---|---|
| KR | 10-1845610 B1 | 4/2018 |
| KR | 10-2020-0098872 A | 8/2020 |
| KR | 10-2020-0099873 A | 8/2020 |
| KR | 10-2130166 B1 | 8/2020 |
| KR | 10-2144404 B1 | 8/2020 |

* cited by examiner

ALL DATA OF COMMUNICATION MESSAGE

☐ : PLAINTEXT DATA
▨ : ENCRYPTED DATA

UNMANNED AERIAL VEHICLE AND APPARATUS FOR GENERATING SOURCE FILES PROVIDING CONFIDENTIAL INFORMATION PROTECTION OF UNMANNED AERIAL VEHICLE

CROSS REFERENCE TO RELATED APPLICATION

This application claims the benefit of Korean Patent Application No. 10-2021-0108812, filed Aug. 18, 2021, which is hereby incorporated by reference in its entirety into this application.

BACKGROUND OF THE INVENTION

1. Technical Field

The disclosed embodiment relates to technology for protecting the confidential information of unmanned aerial vehicles by selectively encrypting the same.

2. Description of Related Art

Unmanned Aerial Vehicles (UAVs) are emerging as a new future industry with the development of wireless communication technology and various electronic device technologies, and markets related to that are expected to expand significantly. Accordingly, the need for security of UAVs and protection of information stored therein is highlighted.

Therefore, there is a method of deleting stored confidential information among conventional technologies. However, due to the characteristics of UAVs, battery issues may occur, or electromagnetic problems may suddenly arise in the internal devices of the UAVs, which may impede the regular operation of such a delete function. Accordingly, technology for improving confidentiality is required when confidential information is stored.

As conventional technology for improving confidentiality, there are techniques for encrypting the entirety of data using a secret key possessed by a UAV. However, when the size of the data to be encrypted is less than the size of an encryption block or when the size of the data is not an integer multiple of the size of an encryption block, padding data is added, whereby the length of ciphertext may become longer than that of plaintext.

Furthermore, an existing UAV communication protocol has to be changed to apply this technique. Also, whether or not data is encrypted can be easily detected in this case. The conventional encryption techniques are not suitable when it is necessary to encrypt only confidential information in a message.

SUMMARY OF THE INVENTION

An object of the disclosed embodiment is to improve confidentiality by simply and selectively encrypting sensitive and confidential information among the information processed and stored by an unmanned aerial vehicle.

An apparatus for creating a source file for providing a function of protecting the confidential information of an unmanned aerial vehicle according to an embodiment may include memory in which at least one program including a creation module is recorded and a processor for executing at least one program including the creation module.

Here, the creation module may create a secure encoder source file and a secure decoder source file using a configuration file in which confidential information, which is the target to be protected, among data communicated or stored by the unmanned aerial vehicle, is recorded.

Here, the secure encoder source file and the secure decoder source file may be used to build a program of the unmanned aerial vehicle. So the unmanned aerial vehicle extracts confidential information from data and encrypts or decrypts the same when the unmanned aerial vehicle communicates or stores the data.

Accordingly, the creation module may create the secure encoder source file and the secure decoder source file, which are capable of being built so as to correspond to a programming language used in the unmanned aerial vehicle, by analyzing content of the configuration file.

Meanwhile, the configuration file may include the identifier (ID) of a communication message and information of at least one confidential field included in the communication message.

Also, the configuration file may further include the range of the value of the confidential field of the communication message.

Here, the confidential field may include confidential parameters stored in the unmanned aerial vehicle.

Such a configuration file may be implemented in at least one of the file formats, including XML, YAML, and JSON, which are capable of representing a data structure.

An unmanned aerial vehicle may include a processor for executing at least one program according to an embodiment.

Here, the program may be a program that is built using source files, including a secure encoder source file created from a configuration file in which confidential information, which is the target to be protected, among data communicated by the unmanned aerial vehicle, is recorded.

The unmanned aerial vehicle program may create a message, extract only confidential information, already configured as the target to be protected, from the created message, encrypt the confidential information, and transmit the message in which the confidential information is encrypted.

Here, encrypting the confidential information may be configured to encrypt the confidential information while preserving the format of the confidential information in data according to preset encryption conditions.

Also, encrypting the confidential information may be configured to encrypt the confidential information in the data using an encryption key shared in advance with another unmanned aerial vehicle to which the message is to be transmitted.

According to an embodiment, an unmanned aerial vehicle may include memory in which at least one program is recorded and a processor for executing at least one program.

Here, the program may be a program that is built using source files, including a secure decoder source file created from a configuration file in which confidential information, which is the target to be protected, among data communicated by the unmanned aerial vehicle, is recorded.

Also, the program may perform receiving a message in which confidential information is encrypted, decrypting the confidential information preset as the target to be protected in the received message, and performing processing on the message, the confidential information of which is decrypted.

Here, decrypting the confidential information may be configured to decrypt the confidential information in data using an encryption key shared in advance with another unmanned aerial vehicle that transmitted the message.

According to an embodiment, an unmanned aerial vehicle may include memory in which at least one program is recorded and a processor for executing at least one program.

Here, the program may be a program that is built using source files, including a secure encoder source file and a secure decoder source file created from a configuration file in which confidential information, which is the target to be protected, among data stored by the unmanned aerial vehicle, is recorded.

Here, the program may obtain data, extract confidential information already configured as the target to be protected on the acquired data, encrypt the confidential information, and store the data in which the confidential information is encrypted.

Also, the program may further perform loading the stored encrypted data and decrypting the confidential information preset as the target to be protected in the data.

Here, encrypting the confidential information or decrypting the confidential information may be configured to encrypt or decrypt the confidential information while preserving the format of the confidential information according to preset encryption conditions.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
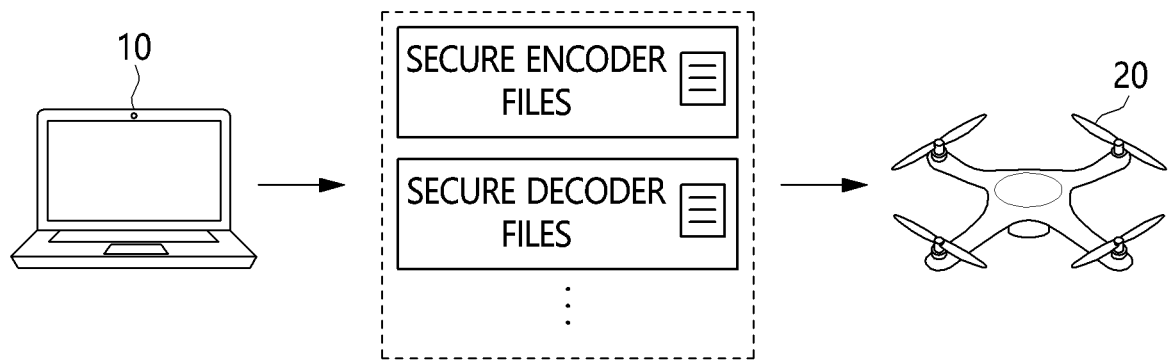
FIG. 1 is a schematic block diagram of a system for providing the function of protecting confidential information to an unmanned aerial vehicle according to an embodiment.

The advantages and features of the present invention and methods of achieving the same will be apparent from the exemplary embodiments to be described below in more detail with reference to the accompanying drawings. However, it should be noted that the present invention is not limited to the following exemplary embodiments and may be implemented in various forms. Accordingly, the exemplary embodiments are provided only to disclose the present invention and to let those skilled in the art know the category of the present invention. The present invention is to be defined based only on the claims. The same reference numerals or the same reference designators denote the same elements throughout the specification.

It will be understood that, although the terms "first," "second," etc., may be used herein to describe various elements, these elements are not intended to be limited by these terms. These terms are only used to distinguish one element from another element. For example, the first element discussed below could be referred to as a second element without departing from the technical spirit of the present invention.

The terms used herein are for the purpose of describing particular embodiments only and are not intended to limit the present invention. As used herein, the singular forms are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Accordingly, terms identical to those defined in generally used dictionaries should be interpreted as having meanings identical to contextual meanings of the related art, and are not to be interpreted as having ideal or excessively formal meanings unless they are definitively defined in the present specification.

The present invention presents a method capable of improving confidentiality by selectively encrypting confidential information of an unmanned aerial vehicle when information is communicated and stored.

With the increasing use of unmanned aerial vehicles, various types of data are transmitted and received between an unmanned aerial vehicle and a control system, and the amount of data stored in unmanned aerial vehicles is increasing. As a result, the risk of exposure to sensitive or important information included in such data is increasing.

In order to solve these problems, an apparatus and method for selectively and securely protecting the confidential information of an unmanned aerial vehicle using format-preserving encryption technology are presented in an embodiment.

Hereinafter, a method for protecting confidential information in an unmanned aerial vehicle according to an embodiment will be described in detail with reference to FIGS. 1 to 7.

FIG. 1 is a schematic block diagram of a system for providing the function of protecting confidential information to an unmanned aerial vehicle according to an embodiment.

Referring to FIG. 1, the system according to an embodiment may include an apparatus for creating a source file for providing the function of protecting confidential information of an unmanned aerial vehicle (referred to as an 'apparatus' hereinbelow) 10 and the unmanned aerial vehicle 20.

Here, the apparatus 10 may be a device possessed by a developer as a general computer system to be described later with reference to FIG. 6, and may be a system for uploading a program to be executed by being built in the unmanned aerial vehicle 20.

The apparatus 10 includes a creation module, which is a program that creates a source file for providing the function of protecting confidential information when the unmanned aerial vehicle 20 transmits/receives or stores data. The creation module will be described in detail later with reference to FIG. 2.

In the unmanned aerial vehicle 20, a program (firmware) operated in the unmanned aerial vehicle 20 can be built. Here, the program can be operated using source files including source files created by the apparatus 10.

Accordingly, the unmanned aerial vehicle 20 may be configured according to an embodiment. When the built program communicates and stores data, it may selectively extract only confidential information and encrypt and decrypt the same, rather than encrypting and decrypting all data. A detailed description thereof will be made later with reference to FIG. 4 and FIG. 5.

Figure 2:
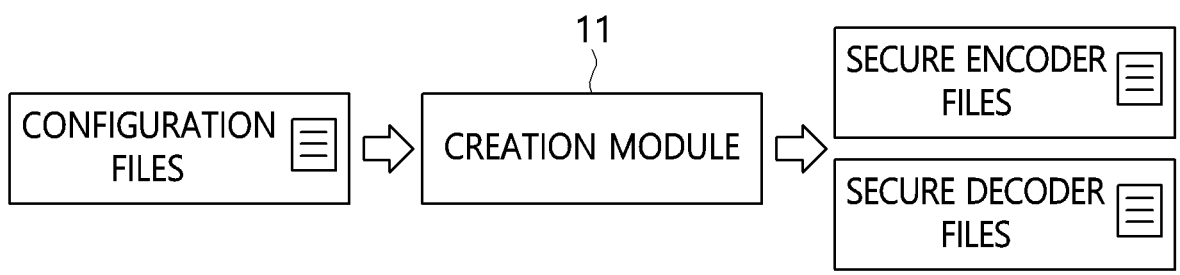
FIG. 2 is a view for explaining a creation module included in the apparatus illustrated in FIG. 1.
Figure 3:
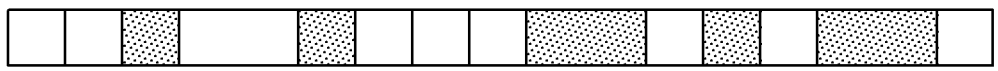
FIG. 3 is an exemplary view of a communication message in which confidential information is encrypted according to an embodiment.

FIG. 2 is a view for explaining the creation module included in the apparatus 10 illustrated in FIG. 1, and FIG. 3 is an exemplary view of a communication message in which confidential information is encrypted according to an embodiment.

Referring to FIG. 2, the creation module 11, according to an embodiment, creates a secure encoder source file and a secure decoder source file from a configuration file in which important fields, which are targets to be protected among the data communicated or stored by the unmanned aerial vehicle 20, are recorded.

According to an embodiment, the apparatus 10 stores the configuration file containing important fields, which are selected as the targets to be protected, among the data used when the unmanned aerial vehicle 20 performs a communication or storage function. Here, when the unmanned aerial vehicle 20 comprises multiple unmanned aerial vehicles, the apparatus 10 may store multiple different configuration files for the respective unmanned aerial vehicles. However, depending on the circumstances, the configuration files stored for the multiple unmanned aerial vehicles may be the same as each other.

The creation module 11 can create a secure encoder source file and a secure decoder source file based on the content recorded in the above-described configuration file to implement communication and storage functions securely.

Here, the creation module 11 analyzes the content of the configuration file, thereby creating a secure encoder source file and a secure decoder source file that can be built so as to correspond to the programming language used in the unmanned aerial vehicle 20.

Here, the secure encoder source file and the secure decoder source file may include a function for encrypting confidential information and a function for decrypting confidential information, respectively, when a communication or storage function is performed.

Accordingly, when the source files are built in the unmanned aerial vehicle 20, the unmanned aerial vehicle 20 may acquire an unmanned aerial vehicle program that is capable of using secure communication and storage functions.

Here, the configuration file may contain content about fields having confidential information for which encryption is required.

Also, the configuration file may be implemented in one of the file formats, including XML, YAML, JSON, and the like, which can represent data structures. Alternatively, a database (DB) may be used depending on the configuration content.

Table 1 below shows an example of some of a configuration file's content in a YAML file format.

TABLE 1

```
(...)
message:
  id: 888
  name: hot_message
  field:
    -
      type: uint16_t
      name: axis
      from: −1000
      to: 1000
    -
```

TABLE 1-continued

```
      type: float
      name: param1
      range:
        from: 0.15
        to: 0.85
(...)
```

The configuration file may contain the identifier (ID) of a communication message and important item fields for which encryption is required in the communication message. For example, as shown in Table 1, '888', which is the ID of a communication message, 'hot_message,' which is the name thereof, and important item fields may be set in the configuration file.

Also, the ranges of the important item fields of the communication message may be set in the configuration file. For example, if a field is able to have a value ranging from 1 to 1000 and if the range is set in the configuration file when the value of the corresponding field is encrypted later, the resultant value may also appear to have a value ranging only from 1 to 1000. Thanks to this property, it is possible to make it challenging to detect whether encryption has been performed based only on the content of the communication message in the state in which the configuration content about which fields are actually encrypted is not known.

Here, the configuration file may also contain important parameters stored in the unmanned aerial vehicle 20. That is, among various types of parameter information used in the unmanned aerial vehicle 20, important parameters may be set in the configuration file. Accordingly, when the important parameters may be encrypted and then be written when they are stored in memory or a storage device, and when the stored content is read, it may be decrypted and then used.

As described above, the secure encoder that is executed based on the secure encoder source file created based on the configuration file may extract confidential information fields from the data to be communicated or stored by the unmanned aerial vehicle 20 and encrypt the same. For example, as illustrated in FIG. 3, only the confidential information fields may be encrypted among all data of the entire communication message.

Also, because the secure encoder is created based on the configuration file, the secure encoder is aware of the location and length of confidential information. Also, the secure encoder is aware of the range of permissible value of the confidential information represented after encryption thereof. Accordingly, the secure encoder may encrypt confidential information in data while preserving the format thereof according to preset encryption conditions. Here, as format-preserving encryption technology, the methods disclosed in Korean Patents No. 10-1516574 and No. 10-1790325 may be used.

Here, the secure encoder may encrypt the confidential information in the data using the encryption key shared in advance with a receiver component.

Meanwhile, the secure decoder, which is executed based on the secure decoder source file, created based on the configuration file, as described above, may extract confidential information from the data communicated or stored by the unmanned aerial vehicle 20 and decrypt the same.

Here, the secure decoder may decrypt the confidential information in the data using the decryption key shared in advance with a sender component.

The unmanned aerial vehicle 20, which is operated using the program built using the above-described secure encoder source file and secure decoder source file, may perform functions of communicating and storing confidential information. Hereinafter, a communication method for protecting the confidential information of an unmanned aerial vehicle will be described first with reference to FIG. 4, and a storage method for protecting the confidential information of an unmanned aerial vehicle will be described with reference to FIG. 5.

Figure 4:
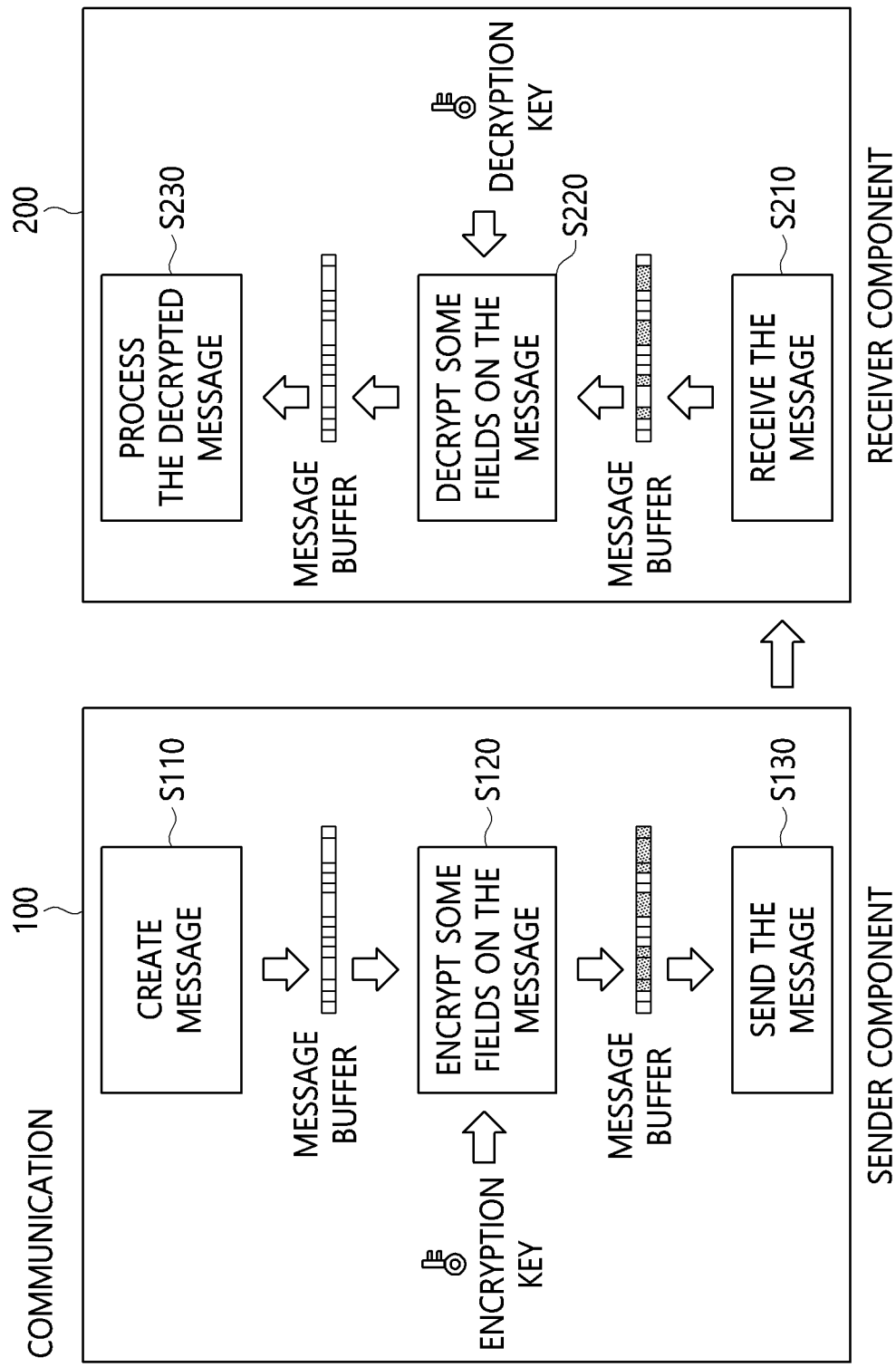
FIG. 4 is a flowchart for explaining a communication method for protecting confidential information in an unmanned aerial vehicle according to an embodiment.

According to an embodiment, FIG. 4 is a flowchart for explaining a communication method for protecting confidential information in an unmanned aerial vehicle.

Referring to FIG. 4, the communication method for protecting confidential information in an unmanned aerial vehicle is a method for communicating encrypted messages between two unmanned aerial vehicles that respectively operate as a sender component 100 and a receiver component 200.

Specifically, the sender component 100 creates a message to transmit at step S110. Here, the created message may be stored in a message buffer.

Then, the sender component 100 extracts confidential information fields from the message and encrypts the same at step S120.

Here, the encryption step (S120) may be performed by a program that is built using a secure encoder source file. Here, the secure encoder source file may be created from a configuration file in which the confidential information fields, which are targets to be protected among the data to be communicated by the unmanned aerial vehicle, are recorded.

Here, the program built using the secure encoder source file is aware of the location and length of the field to which confidential information is recorded, among the data written to the message buffer. The program built using the secure encoder source file is also aware of the range of a permissible value of the corresponding information represented after encryption thereof. Accordingly, at the encryption step (S120), the confidential information in the data may be encrypted in the state in which the format thereof is preserved according to preset encryption conditions.

Also, at the encryption step (S120), the confidential information fields of the data may be encrypted using the encryption key shared in advance with the receiver component 200. Here, the message in which only the confidential information fields are encrypted may be stored in the message buffer.

The sender component 100 transmits the message stored in the message buffer to the receiver component 200 at step S130.

Accordingly, the receiver component 200 receives the message in which the confidential information is encrypted at step S210. Here, the received message may be stored in a message buffer.

The receiver component 200 decrypts the encrypted confidential information fields in the message stored in the message buffer at step S220.

Here, the decryption step (S220) may be performed by a program that is built using a secure decoder source file. Here, the secure decoder source file may be created from a configuration file in which the confidential information, which is the target to be protected, among the data communicated by the unmanned aerial vehicle, is recorded.

Here, at the decryption step (S220), the confidential information fields of the data may be decrypted using the decryption key shared in advance with the sender component 100. Here, the decrypted message may be stored in the message buffer.

Then, the receiver component 200 performs processing on the decrypted message at step S230.

Figure 5:
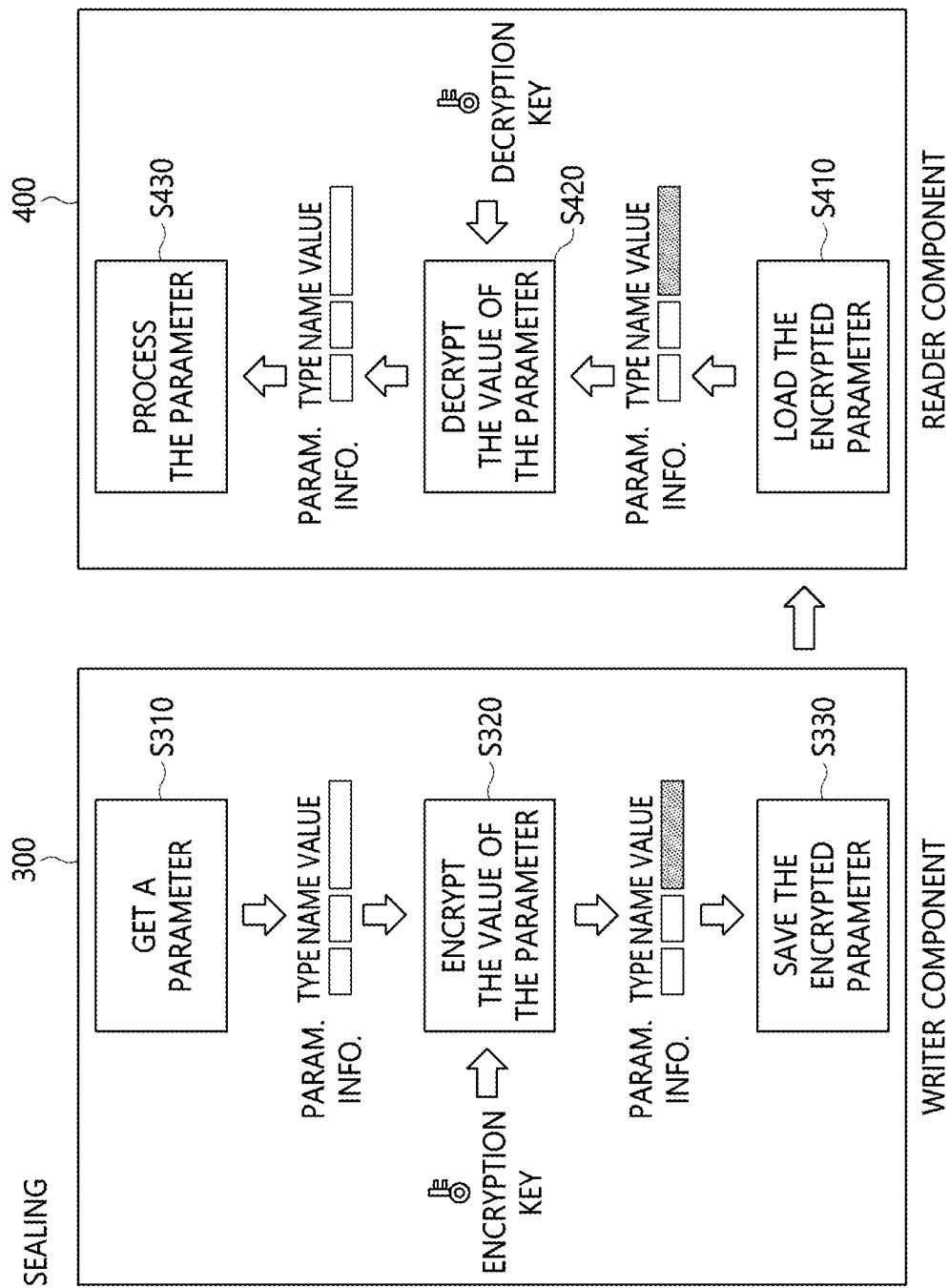
FIG. 5 is a flowchart for explaining a storage method for protecting confidential information in an unmanned aerial vehicle according to an embodiment.

FIG. 5 is a flowchart for explaining a storage method for protecting confidential information in an unmanned aerial vehicle according to an embodiment.

Referring to FIG. 5, the unmanned aerial vehicle operates as a writer component 300 or a reader component 400 so as to store data after encrypting. Then, the unmanned aerial vehicle loads the encrypted data and decrypts the same.

Here, the data may include various parameters. According to an embodiment, the unmanned aerial vehicle extracts confidential parameters from the data and encrypts and decrypts the same.

When it stores the values of the confidential parameters, the unmanned aerial vehicle encrypts the values using format-preserving encryption technology and stores the same.

Specifically, the writer component 300 acquires the parameters to store at step S310. Here, the parameter information may be configured with 'TYPE,' NAME,' and 'VALUE.'

That is, various kinds of information delivered to the unmanned aerial vehicle take the form of parameters. Here, each field containing such information has a small size of several bytes. For example, many fields are of an integer type or a floating-point number type having a length of 4 bytes.

Subsequently, the writer component 300 extracts the 'VALUE' field of the confidential parameter from the parameters and encrypts the same at step S320. That is, as illustrated in FIG. 5, the 'VALUE' field is encrypted, among the 'TYPE,' NAME,' and 'VALUE' fields. Here, the encryption step (S320) may be performed by a program that is built using a secure encoder source file created from a configuration file in which the confidential parameters, which are targets to be protected, among the parameters stored in the unmanned aerial vehicle, are recorded.

Here, the program that is built using the secure encoder source file is aware of the location at which the confidential parameter is recorded and the length of the confidential parameter, among the parameters. Also, the program that is built using the secure encoder source file is aware of the range of a permissible value of the corresponding information, represented after encryption thereof.

Accordingly, at the encryption step (S320), the confidential information in the data may be encrypted while preserving the format thereof according to preset encryption conditions. That is, the writer component 300 may selectively encrypt pieces of information having such a small size on a per-field basis using format-preserving encryption technology. Also, after encryption, the format of the value is maintained such that the value falls within a permissible range that can be represented in the format before encryption, which makes it challenging to detect whether or not encryption is performed.

For reference, when block encryption technology is used, if the parameter to be encrypted has a small size, padding is added thereto, which increases the size of ciphertext. Also, for this reason, compatibility with existing communication protocols is not provided.

Also, at the encryption step S320, the parameter may be encrypted using the encryption key shared in advance with the reader component 400.

Subsequently, the writer component 300 stores the parameter information in which only confidential parameters are encrypted at step S330.

Accordingly, the reader component 400 may load the stored encrypted parameter information at step S410.

The reader component 400 decrypts the encrypted confidential parameters in the loaded parameter information at step S420.

Here, the decryption step (S420) may be performed by a program that is built using a secure decoder source file created from a configuration file in which the confidential parameters, which are targets to be protected among the data stored by the unmanned aerial vehicle, are recorded.

Here, at the decryption step (S420), the confidential parameters in the data may be decrypted using the decryption key shared in advance with the writer component 300.

Subsequently, the reader component 400 performs processing on the decrypted parameters at step S430.

Because the values encrypted and stored as described above can be decrypted only by a remote control system that shares an encryption key with the unmanned aerial vehicle that stores the corresponding values, confidential information may be protected from unauthorized access.

Figure 6:
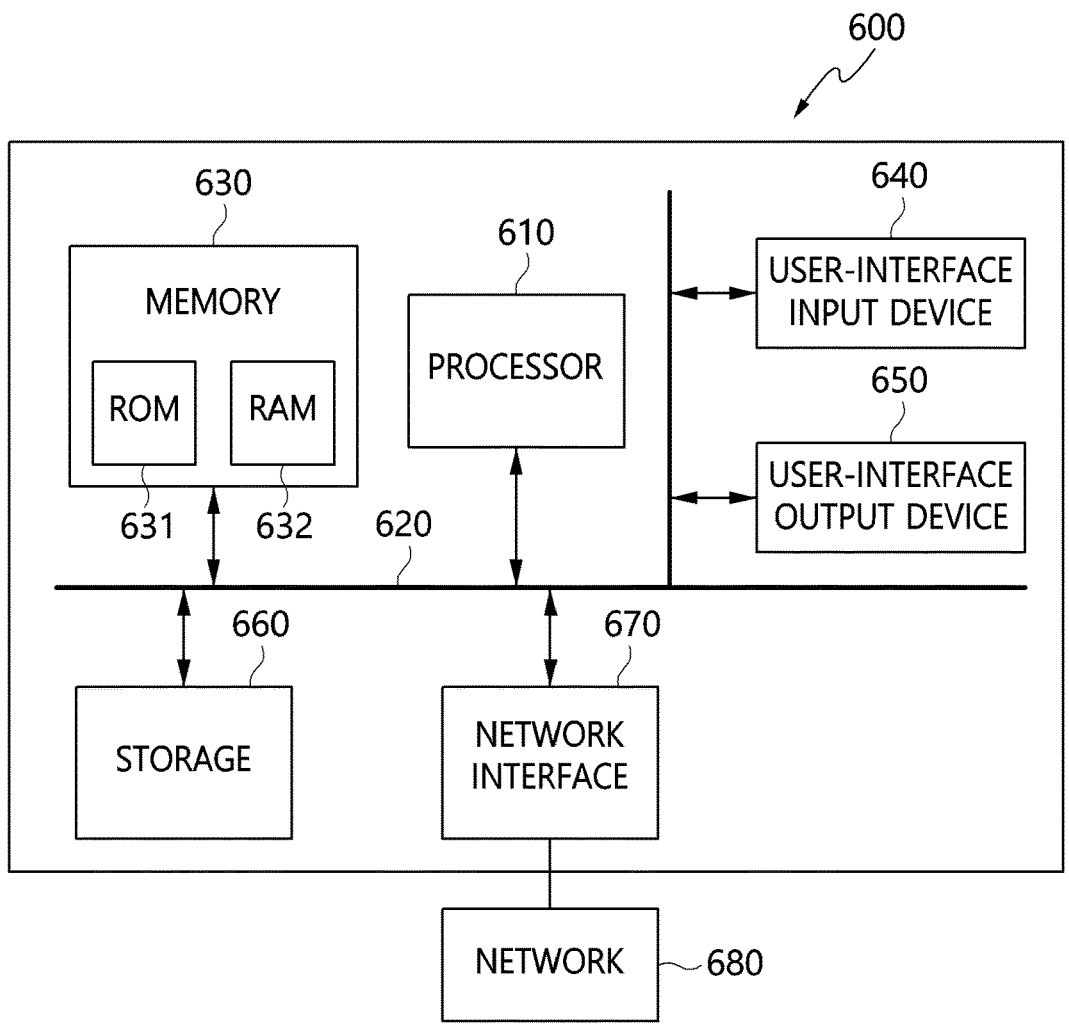
FIG. 6 is a view illustrating a computer system configuration according to an embodiment.

FIG. 6 illustrates a computer system configuration according to an embodiment.

The apparatus 10, according to an embodiment, may be implemented in a computer system 1000 including a computer-readable recording medium.

The computer system 1000 may include one or more processors 1010, memory 1030, a user interface input device 1040, a user-interface output device 1050, and storage 1060, which communicate with each other via a bus 1020. Also, the computer system 1000 may further include a network interface 1070 connected to a network 1080. The processor 1010 may be a central processing unit or a semiconductor device for executing a program or processing instructions stored in the memory 1030 or the storage 1060.

Here, according to an embodiment, the program stored in the memory 1030 or the storage 1060 may include the creation module 11 described above with reference to FIG. 2. The creation module 11 may be executed by the processor 1010.

The memory 1030 and the storage 1060 may be storage media including at least one of a volatile medium, a nonvolatile medium, a detachable medium, a non-detachable medium, a communication medium, and an information delivery medium. For example, the memory 1030 may include ROM 1031 or RAM 1032.

Figure 7:
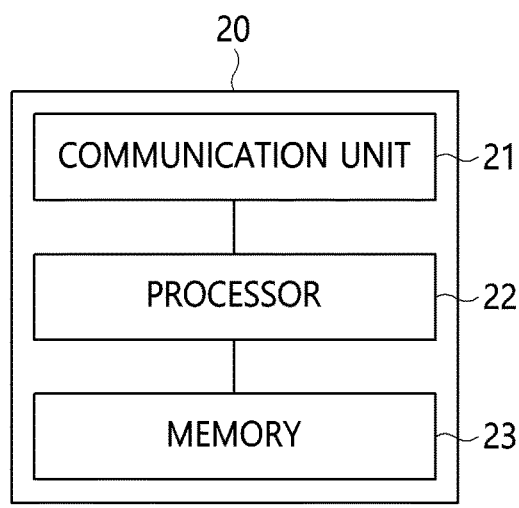
FIG. 7 is a view illustrating the configuration of an unmanned aerial vehicle according to an embodiment.

FIG. 7 is a view illustrating the configuration of an unmanned aerial vehicle according to an embodiment.

Here, FIG. 7 illustrates only components for the operation of the present invention because other components included in the unmanned aerial vehicle 20 may obscure the gist of the present invention.

The unmanned aerial vehicle 20, according to an embodiment, may include a communication unit 21 capable of sending and receiving signals, a processor 22, and memory 23.

The communication unit 21 may transmit and receive signals to and from another unmanned aerial vehicle or other computer devices including a user terminal, to control the unmanned aerial vehicle via a communication network.

The processor 22 may execute a program or process instructions stored in the memory 23.

According to an embodiment, the program stored in the memory 23 may include the unmanned aerial vehicle program that is built using the secure encoder source file and the secure decoder source file created by the apparatus 10, as described above.

According to an embodiment, confidentiality of communication messages may be improved without changing an existing communication protocol used by unmanned aerial vehicles. This is because format-preserving encryption technology is used and because encryption is performed without changing the data sizes or types of respective fields in a message in consideration of compatibility with existing protocols.

Also, only important portions of a communication message can be selectively encrypted, whereby the load imposed by encryption may be reduced, and encryption may be performed such that whether or not encryption is performed cannot be easily detected.

Also, confidential information or parameter values in an unmanned aerial vehicle can be encrypted, like communication messages, whereby confidential information in the unmanned aerial vehicle may be protected from unauthorized access.

Also, the confidentiality of information used in an unmanned aerial vehicle may be improved using the secure encoder and decoder that are capable of securely transmitting, receiving, and storing messages.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. A system comprising an unmanned aerial vehicle and a device,
   wherein the device creates a secure encoder source file and a secure decoder source file based on a configuration file in which confidential information is recorded, the confidential information being a target to be protected among data communicated or stored by the unmanned aerial vehicle,
   wherein the unmanned aerial vehicle executes at least one program which is built with the secure encoder source file and the secure decoder source file,
   wherein the program performs:
   creating a message;
   extracting only confidential information, preset as a target to be protected, from the created message and encrypting the confidential information; and
   transmitting the message in which the confidential information is encrypted,
   wherein the secure encoder source file and the secure decoder source file are created by analyzing content of the configuration file, which are built so as to correspond to a program language used in the unmanned aerial vehicle,
   wherein the confidential information, preset as a target to be protected, includes an identifier (ID) of the message to be communicated, information of at least one confidential field included in the message, and a range of a value of the confidential field of the message,
   wherein the confidential information includes confidential parameters stored in the unmanned aerial vehicle,
   wherein the configuration file is implemented in a file format which represents a data structure, and
   wherein the confidential parameters stored in the unmanned aerial vehicle are used as part of the secure encoder source file and the secure decoder source file.

2. The system of claim 1, wherein
encrypting the confidential information is configured to encrypt the confidential information while preserving a format of the confidential information in data according to preset encryption conditions.

3. The system of claim 1, wherein the program further performs
receiving the message in which the confidential information is encrypted;
decrypting the confidential information preset as the target to be protected in the received message; and
performing processing on the message, the confidential information of which is decrypted.

\* \* \* \* \*